(12) United States Patent
Hobbs et al.

(10) Patent No.: US 8,802,790 B2
(45) Date of Patent: *Aug. 12, 2014

(54) POLYUREA COMPOSITIONS AND METHODS OF USE

(71) Applicant: PRC-DeSoto International, Inc., Sylmar, CA (US)

(72) Inventors: Steven J. Hobbs, Gilbert, AZ (US); Juexiao Cai, Stevenson Ranch, CA (US); Marfi Ito, Culver City, CA (US); Renhe Lin, Stevenson Ranch, CA (US)

(73) Assignee: PRC-DeSoto International, Inc., Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,772

(22) Filed: Feb. 20, 2014

(65) Prior Publication Data

US 2014/0171587 A1 Jun. 19, 2014

Related U.S. Application Data

(63) Continuation of application No. 13/934,286, filed on Jul. 3, 2013, and a continuation of application No. 13/051,002, filed on Mar. 18, 2011, now Pat. No. 8,507,617.

(51) Int. Cl.
*C08L 75/02* (2006.01)
*C08G 18/12* (2006.01)
*C08G 18/52* (2006.01)
*C08G 18/56* (2006.01)

(52) U.S. Cl.
USPC ........... 525/452; 525/473; 528/59; 528/60

(58) Field of Classification Search
USPC .................. 525/452, 473; 528/60, 609
See application file for complete search history.

(56) References Cited

U.S. PATENT DOCUMENTS

| | | | | |
|---|---|---|---|---|
| 2,900,368 A | * | 8/1959 | Stilmar | 528/61 |
| 3,959,227 A | * | 5/1976 | Chang et al. | 528/266 |
| 3,997,612 A | * | 12/1976 | Lenke et al. | 568/46 |
| 3,997,614 A | * | 12/1976 | Lenke et al. | 568/45 |
| 4,366,307 A | * | 12/1982 | Singh et al. | 528/373 |
| 2009/0012244 A1 | * | 1/2009 | Rao et al. | 525/452 |

* cited by examiner

*Primary Examiner* — Randy Gulakowski
*Assistant Examiner* — Christopher M Rodd
(74) *Attorney, Agent, or Firm* — William Lambert

(57) ABSTRACT

Disclosed are polyurea compositions comprising the reaction products of a polyformal-isocyanate prepolymer and a curing agent comprising an amine. The compositions are useful as sealants in aerospace applications.

21 Claims, 1 Drawing Sheet

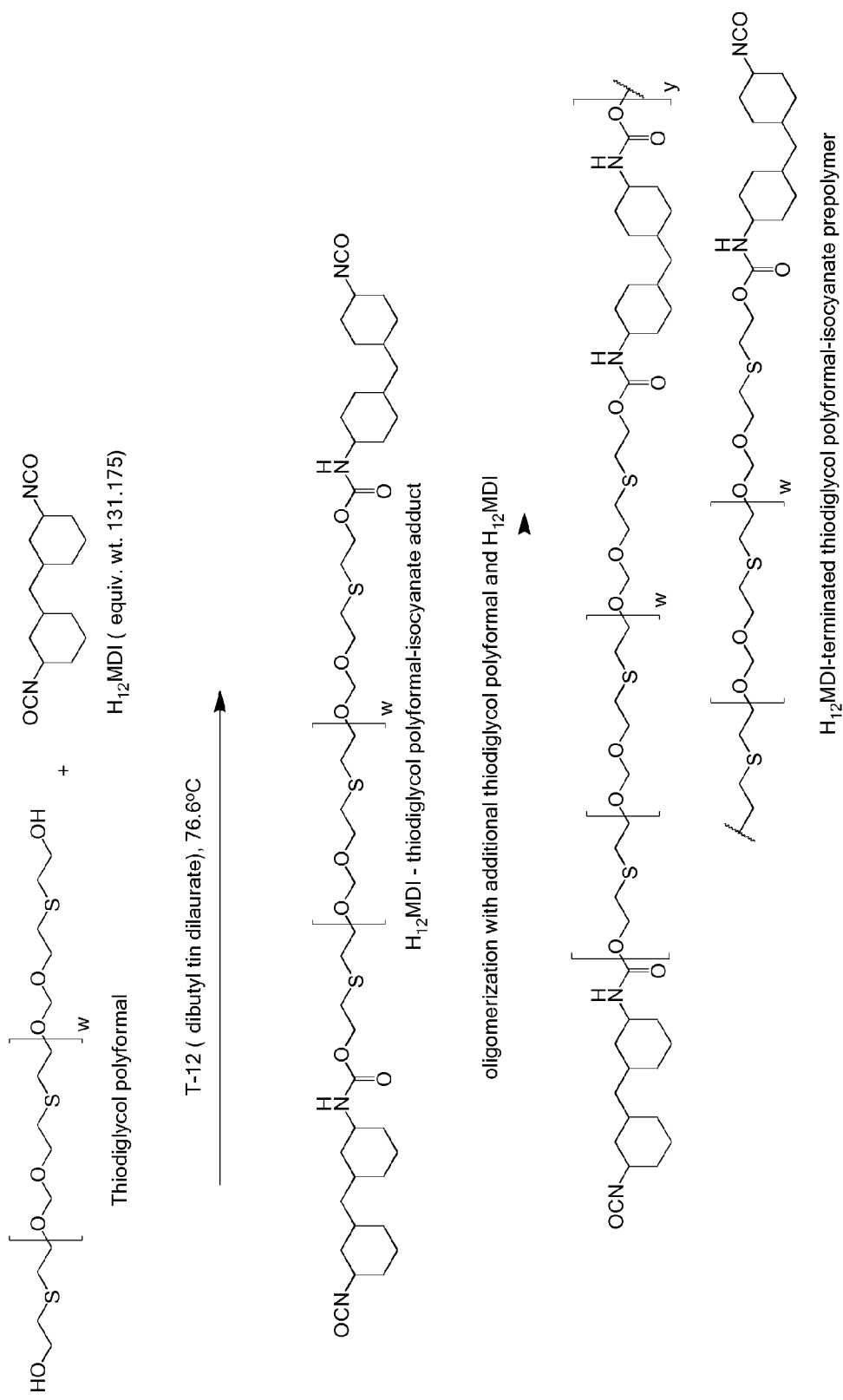

US 8,802,790 B2

POLYUREA COMPOSITIONS AND METHODS OF USE

CROSS-REFERENCE TO RELATED APPLICATION

This application is a continuation application of U.S. patent application Ser. No. 13/934,286, filed Jul. 3, 2013, now allowed, which is a continuation application of U.S. patent application Ser. No. 13/051,002, filed Mar. 18, 2011, which issued as U.S. Pat. No. 8,507,617 on Aug. 13, 2013.

FIELD

The present disclosure relates to polyurea compositions and methods of using the polyurea compositions.

BACKGROUND

Thiol-terminated sulfur-containing polymers are known to be well-suited for use in various applications such as aerospace sealant compositions, due, in large part, to their fuel-resistance. Other desirable properties for aerospace sealant compositions include low temperature flexibility, short curing time (the time required to reach a predetermined strength), and elevated-temperature resistance, among others. Sealant compositions exhibiting at least some of these characteristics and containing thiol-terminated sulfur-containing polymers are described, for example, in U.S. Pat. Nos. 2,466,963, 4,366,307, 4,609,762, 5,225,472, 5,912,319, 5,959,071, 6,172,179, 6,232,401, 6,372,849, and 6,509,418. Polysulfides are also used in aerospace sealant applications where they provide high tensile strength, high shear strength, high-temperature thermal resistance, and fuel resistance, as disclosed, for example, in U.S. Pat. No. 7,638,162 and U.S. Publication No. 2005/0245695.

Polythioethers that are liquid at room temperature and pressure and that have excellent low temperature flexibility and fuel resistance, such as are disclosed in U.S. Pat. No. 6,172,179, are also useful in aerospace sealant applications. Difunctional polythioethers having terminal hydroxyl groups prepared by reacting a hydroxyl compound with an aldehyde are described, for example, in GB 850,178, U.S. Pat. No. 3,959,227, and U.S. Pat. No. 3,997,614. Difunctional polythioethers terminated or capped with isocyanates are also known as disclosed, for example, in GB 850,178, and in U.S. Pat. Nos. 3,290,382, 3,959,227, and 3,997,614. Difunctional, linear polythioethers, however, often swell upon prolonged exposure to hydrocarbon fuel and other lubricants. On the other hand, sealants made using polyfunctional polythioethers, can exhibit good fuel resistance, hardness, and flexibility, but often with compromised elongation.

It is desirable to provide compositions that are useful as fuel-resistant and water-resistant sealants with improved tensile strength and elongation.

SUMMARY

Polyurea compositions for use as sealants having enhanced properties useful for aerospace sealant applications are provided.

In a first aspect of the present disclosure, compositions are provided comprising a polyformal-isocyanate prepolymer comprising the reaction products of reactants comprising a polyformal polyol and a first diisocyanate; and a curing agent comprising an amine.

In a second aspect of the present disclosure, compositions are provided comprising the reaction products of reactants comprising a polyformal-isocyanate prepolymer comprising the reaction products of a polyformal polyol and a first aliphatic diisocyanate; a polythioether-isocyanate prepolymer comprising the reaction products of a polythioether polyol and a second aliphatic diisocyanate; and an aromatic diamine.

In a third aspect of the present disclosure, apertures sealed with a sealant comprising compositions provided by the present disclosure are provided.

The present invention is also directed to, inter alia, methods for making such polyurea compositions, and sealants, including aerospace sealants, comprising such polyurea compositions.

BRIEF DESCRIPTION OF THE DRAWINGS

Those skilled in the art will understand that the drawings, described herein, are for illustration purposes only. The drawings are not intended to limit the scope of the present disclosure.

FIG. 1 shows an example of a reaction for preparing a 4,4'-methylene dicyclohexyl diisocyanate ($H_{12}MDI$)-terminated thiodiglycol polyformal-isocyanate prepolymer.

DETAILED DESCRIPTION

Definitions

A dash ("-") that is not between two letters or symbols is used to indicate a point of bonding for a substituent or between two atoms. For example, —$CONH_2$ is attached through the carbon atom.

"Aldehyde" refers to a compound of the formula CH(O)R where R is hydrogen or a hydrocarbon group such as an alkyl group, as defined herein. In certain embodiments, the aldehyde is $C_{1-10}$ aldehyde, $C_{1-6}$ aldehyde, $C_{1-4}$ aldehyde, $C_{1-3}$ aldehyde, and in certain embodiments, $C_{1-2}$ aldehyde. In certain embodiments, the aldehyde is formaldehyde. In certain embodiments of the aldehyde, R is selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

"Alkanediyl" refers to a diradical of a saturated, branched or straight-chain, acyclic hydrocarbon group, having, for example, from 1 to 18 carbon atoms ($C_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-3}$). In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl.

"Aryl" refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes 5- and 6-membered carbocyclic aromatic rings fused to a 5- to 7-membered heterocycloalkyl ring containing one or more heteroatoms selected from N, O, and S. For such fused, bicyclic ring systems wherein only one of the rings is a carbocyclic aromatic ring, the point of attachment may be at the carbocyclic aromatic ring or the heterocycloalkyl ring. Examples of aryl groups include derived from aceanthrylene, acenaphthylene, acephenanthrylene, anthracene, azulene, benzene, chrysene, coronene, fluoranthene, fluorene, hexacene, hexaphene, hexylene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, the aryl group can have from 6 to 20 carbon atoms, and in certain embodiments, 6 to 12 carbon atoms, and in certain embodiments, from 6 to 10 carbon atoms. Aryl, however, does not encompass or overlap in any way with heteroaryl, separately defined herein. Hence, a multiple ring system in which one or more carbocyclic aromatic rings is fused to a heterocycloalkyl aromatic ring, is heteroaryl, not aryl, as defined herein. In certain embodiments, an aryl group is phenyl.

"Arylalkyl" refers to an alkyl group in which one of the hydrogen atoms is replaced with an aryl group. In certain embodiments of an arylalkyl group, a hydrogen atom on the terminal carbon atom of an alkyl group is replaced with an aryl group. In certain embodiments of arylalkyl, the aryl group is a $C_{6-12}$ aryl group, in certain embodiments a $C_{6-10}$ aryl group, and in certain embodiments, a phenyl or naphthyl group. In certain embodiments, the alkanediyl portion of an arylalkyl group may be, for example, $C_{1-10}$ alkanediyl, $C_{1-6}$ alkanediyl, $C_{1-4}$ alkanediyl, $C_{1-3}$ alkanediyl, propane-1,3-diyl, ethane-1,2-diyl, or methane-diyl. In certain embodiments, the arylalkyl group is $C_{7-18}$ arylalkyl, $C_{7-16}$ arylalkyl, $C_{7-12}$ arylalkyl, $C_{7-10}$ arylalkyl, or $C_{7-9}$ arylalkyl. For example, $C_{7-9}$ arylalkyl can include a $C_{1-3}$ alkanediyl group bonded to a phenyl group.

"Cycloalkylalkyl" refers to an alkyl group in which one of the hydrogen atoms is replaced with a cycloalkyl group. In certain embodiments of the cycloalkylalkyl group, a hydrogen atom on the terminal carbon atom of an alkyl group is replaced with a cycloalkyl group. In certain embodiments of cycloalkylalkyl, the cycloalkyl group is a $C_{3-6}$ cycloalkyl group, in certain embodiments a $C_{5-6}$ cycloalkyl group, and in certain embodiments, a cyclopropyl, a cyclobutyl, a cyclopentyl, or a cyclohexyl group. In certain embodiments, the alkanediyl portion of a cycloalkylalkyl group may be, for example, $C_{1-10}$ alkanediyl, $C_{1-6}$ alkanediyl, $C_{1-4}$ alkanediyl, $C_{1-3}$ alkanediyl, propane-1,3-diyl, ethane-1,2-diyl, or methane-diyl. In certain embodiments, the cycloalkylalkyl group is $C_{4-16}$ cycloalkylalkyl, $C_{4-12}$ cycloalkylalkyl, $C_{4-10}$ cycloalkylalkyl, $C_{6-12}$ cycloalkylalkyl, or $C_{6-9}$ cycloalkylalkyl. For example, $C_{6-9}$ cycloalkylalkyl includes a $C_{1-3}$ alkanediyll group bonded to a cyclopentyl or to a cyclohexyl group.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, an alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, an alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heteroalkyl" refers to an alkyl group in which one or more of the carbon atoms are replaced with a heteroatom, such as N, O, S, or P. In certain embodiments of heteroalkyl, the heteroatom is selected from N and O.

"Heteroaryl" refers to a monovalent heteroaromatic radical derived by the removal of one hydrogen atom from a single atom of a parent heteroaromatic ring system. Heteroaryl encompasses multiple ring systems having at least one heteroaromatic ring fused to at least one other ring, which can be aromatic or non-aromatic. Heteroaryl encompasses 5- to 7-membered aromatic, monocyclic rings containing one or more, for example, from 1 to 4, or in certain embodiments, from 1 to 3, heteroatoms selected from N, O, S, and P with the remaining ring atoms being carbon; and bicyclic heterocycloalkyl rings containing one or more, for example, from 1 to 4, or in certain embodiments, from 1 to 3, heteroatoms selected from N, O, S, and P, with the remaining ring atoms being carbon and wherein at least one heteroatom is present in an aromatic ring. For example, heteroaryl includes a 5- to 7-membered heteroaromatic ring fused to a 5- to 7-membered cycloalkyl ring. For such fused, bicyclic heteroaryl ring systems wherein only one of the rings contains one or more heteroatoms, the point of attachment may be at the heteroaromatic ring or the cycloalkyl ring. In certain embodiments, where the total number of N, O, S, and P atoms in the heteroaryl group exceeds one, the heteroatoms are not adjacent to one another. In certain embodiments, the total number of N, O, S, and P atoms in the heteroaryl group is not more than two. In certain embodiments, the total number of N, O, S, and P atoms in the aromatic heterocycle is not more than one. Heteroaryl does not encompass or overlap with aryl as defined herein. Examples of heteroaryl groups include groups derived from acridine, arsindole, carbazole, α-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain embodiments, the heteroaryl group is $C_{5-20}$ heteroaryl, $C_{5-12}$ heteroaryl, $C_{5-10}$ heteroaryl, and in certain embodiments, $C_{5-6}$ heteroaryl. In certain embodiments, heteroaryl groups are those derived from thiophene, pyrrole, benzothiophene, benzofuran, indole, pyridine, quinoline, imidazole, oxazole, or pyrazine.

"Ketone" refers to a compound of the formula $CO(R)_2$ where each R is a hydrocarbon group. In certain embodiments of a ketone, each R is independently selected from $C_{1-6}$ alkyl, $C_{7-12}$ phenylalkyl, substituted $C_{7-12}$ phenylalkyl, $C_{6-12}$ cycloalkylalkyl, and substituted $C_{6-12}$ cycloalkylalkyl. In certain embodiments of the ketone, each R is independently selected from methyl, ethyl, and propyl. In certain embodiments, the ketone is selected from propan-2-one, butan-2-one, pentan-2-one, and pentan-3-one. In certain embodiments of the ketone, each R is independently selected from $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cyclo alkyl, $C_{6-12}$ aryl, and substituted $C_{6-12}$ aryl.

"Phenylalkyl" refers to an alkyl group in which one of the hydrogen atoms are replaced with a phenyl group. In certain embodiments of the phenylalkyl group, one of the hydrogen atoms of the terminal carbon atom of an alkyl group is replaced with a phenyl group. In certain embodiments, the phenylalkyl group is $C_{7-12}$ phenylalkyl, $C_{7-10}$ phenylalkyl, $C_{7-9}$ phenylalkyl, and in certain embodiments, benzyl.

"Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, =O, $C_{1-6}$ alkyl, $C_{1-3}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, the substituent is selected from —OH, —NH$_2$, and $C_{1-3}$ alkyl.

Unless otherwise made explicit, a polymer encompasses one or more types of polymers. For example, reference to a polyformal polyol includes a single type of polyformal polyol such as a thiodiglycol polyformal polyol, and a mixture of different types of polyformal polyols. Similarly, unless otherwise made explicit, reference to a compound such as, for example, a compound of a specific formula or a diisocyanate, refers to a single type of compound or diisocyanate and more than one type of compound or diisocyanate.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Reference is now made in detail to certain embodiments of compounds, compositions, and methods. The disclosed embodiments are not intended to be limiting of the claims. To the contrary, the claims are intended to cover all alternatives, modifications, and equivalents.

Polyurea Compositions

In certain embodiments, compositions provided by the present disclosure comprise a polyformal-isocyanate prepolymer and a curing agent comprising an amine, wherein the polyformal-isocyanate prepolymer comprises the reaction products of reactants comprising a polyformal polyol and a first diisocyanate.

In certain embodiments, the polyformal polyol comprises a polyformal polyol selected from a polyformal diol, a polyformal polyol having at least three hydroxyl groups per polyformal molecule, and a combination thereof. In certain embodiments, the polyformal polyol comprises a polyformal polyol selected from a polyformal diol, a polyformal triol, and a combination thereof. In certain embodiments, the polyformal polyol comprises a combination of a polyformal diol and a polyformal triol.

In certain embodiments, a polyformal polyol comprises: (i) the reaction products of reactants comprising a sulfur-containing diol; and a reactant selected from an aldehyde, a ketone, and a combination thereof; (ii) the reaction products of reactants comprising a sulfur-containing diol; a polyol containing at least three hydroxyl groups per polyol molecule; and a reactant selected from an aldehyde, a ketone, and a combination thereof; and (iii) a combination of (i) and (ii).

In certain embodiments of reaction (i), the sulfur-containing diol comprises a single type of sulfur-containing diol, and in certain embodiments, comprises a combination of sulfur-containing diols.

In certain embodiments, the polyformal polyol comprises the reaction products of a sulfur-containing diol; and a reactant selected from an aldehyde, a ketone, and a combination thereof. In certain embodiments of the reaction, the sulfur-containing diol comprises a diol of Formula (1):

(1)

where each $R^3$ is independently selected from $C_{2-6}$ alkanediyl. In certain embodiments of a sulfur-containing diol of Formula (1), each $R^3$ is the same and in certain embodiments, each $R^3$ is different. In certain embodiments, each $R^3$ is selected from $C_{2-5}$ alkanediyl, $C_{2-4}$ alkanediyl, $C_{2-3}$ alkanediyl, and in certain embodiments, each $R^3$ is ethane-1,2-diyl. In certain embodiments of the reaction, the sulfur-containing diol comprises a sulfur-containing diol selected from 2,2'-thiodiethanol, 3,3'-thiobis(propan-1-ol), 4,4'-thiobis(butan-1-ol), and a combination of any of the foregoing. In certain embodiments of the reaction, the sulfur-containing diol comprises 2,2'-thiodiethanol.

In certain embodiments of reaction (i), the reactant is an aldehyde. In certain embodiments in which the reactant is an aldehyde, the aldehyde comprises a $C_{1-6}$ aldehyde, a $C_{1-4}$ aldehyde, a $C_{1-3}$ aldehyde, and in certain embodiments, a $C_{1-2}$ aldehyde. In certain embodiments, the aldehyde is formaldehyde. In certain embodiments in which the reactant is formaldehyde, the formaldehyde is provided as paraformaldehyde.

In certain embodiments of reaction (i), the reactant is a ketone. In certain embodiments in which the reactant is a ketone, the ketone has the formula $COR_2$ where each R is independently selected from $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl. In certain embodiments of a ketone, each R is independently selected from methyl, ethyl, and propyl. In certain embodiments, a ketone is selected from propan-2-one, butan-2-one, pentan-2-one, and pentan-3-one.

In certain embodiments of reaction (i), the polyformal polyol comprises the reaction product of reactants comprising 2,2'-thiodiethanol and formaldehyde, and is referred to herein as thiodiglycol polyformal.

In certain embodiments, a polyformal polyol has a number average molecular weight from 200 to 6,000 Daltons, from 500 to 5,000 Daltons, from 1,000 to 5,000 Daltons, from 1,500 to 4,000 Daltons, and in certain embodiments, from 2,000 to 3,600 Daltons.

In certain embodiments, polyformal polyols provided by the present disclosure comprise: (ii) the reaction products of reactants comprising a sulfur-containing diol; a polyol containing at least three (3) hydroxyl groups per polyol molecule; and a reactant selected from an aldehyde, a ketone, and a combination thereof. The reactants may comprise one or more types of sulfur-containing diol, one or more types of polyol, and/or one or more types of aldehyde and/or ketone.

In certain embodiments of reaction (ii), the sulfur-containing diol comprises a diol of Formula (1) where each $R^3$ is independently selected from $C_{2-6}$ alkanediyl. In certain embodiments of reaction (ii), the sulfur-containing diol comprises a sulfur-containing diol selected from 2,2'-thiodiethanol, 3,3'-thiobis(propan-1-ol), 4,4'-thiobis(butan-1-ol), and a combination of any of the foregoing. In certain embodiments of the reaction, the sulfur-containing diol comprises 2,2'-thiodiethanol.

In certain embodiments of reaction (ii), the sulfur-containing diol comprises a single type of sulfur-containing diol, and in certain embodiments, comprises a combination of sulfur-containing diols.

In certain embodiments of reaction (ii), a polyol contains at least three hydroxyl groups per polyol molecule. For example, a polyol may contain from three to ten hydroxyl groups per polyol molecule, from three to eight hydroxyl groups per polyol molecule, from three to six hydroxyl groups per polyol molecule, and in certain embodiments, from three to four hydroxyl groups per polyol molecule. In certain embodiments, a polyol contains four hydroxyl groups per polyol molecule, and in certain embodiments, a polyol contains three hydroxyl groups per polyol molecule. The polyol may be a single type of polyol or may be a combination of different polyols having the same or different number of hydroxyl groups per molecule.

In certain embodiments, a polyol has the formula $E(OH)_z$, where z is an integer from 3 to 6, and E represents the core of the z-valent polyol. In certain embodiments, a polyol comprises a triol (z is 3) of Formula (2):

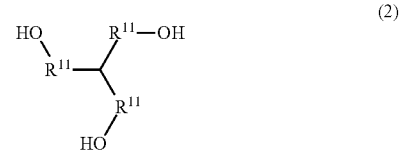
(2)

where each $R^{11}$ is independently $C_{1-6}$ alkanediyl; and in certain embodiments, a polyol comprises a triol of Formula (3):

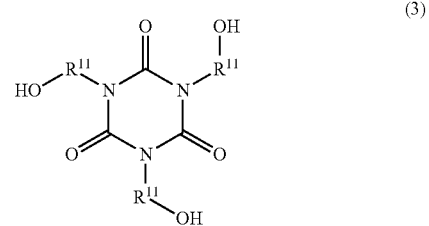
(3)

where each $R^{11}$ is independently $C_{1-6}$ alkanediyl. In certain embodiments of a polyol of Formula (2) and Formula (3), each $R^{11}$ may be independently selected from $C_{1-4}$ alkanediyl, and in certain embodiments, from $C_{1-3}$ alkanediyl. In certain embodiments of a polylol of Formula (2) and Formula (3), each $R^{11}$ may be the same, and in certain embodiments, each $R^{11}$ may be different. In certain embodiments of a polyol of Formula (2) and Formula (3), each $R^{11}$ is selected from methanediyl, ethane-1,2-diyl, propane-1,3-diyl, and in certain embodiments, butane-1,4-diyl.

In certain embodiments of reaction (ii), the reactant is an aldehyde. In certain embodiments in which the reactant is an aldehyde, the aldehyde comprises a $C_{1-6}$ aldehyde, a $C_{1-4}$ aldehyde, a $C_{1-3}$ aldehyde, and in certain embodiments, a $C_{1-2}$ aldehyde. In certain embodiments, the aldehyde comprises an alkyl and is selected from acetaldehyde, propionaldehyde, isobutyraldehyde, and butyraldehyde. In certain embodiments, the aldehyde is formaldehyde. In certain embodiments in which the reactant is formaldehyde, the formaldehyde is provided as paraformaldehyde.

In certain embodiments of reaction (ii), the reactant is a ketone. In certain embodiments in which the reactant is a ketone, the ketone has the formula C(O)R$_2$ where each R is independently selected from C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl. In certain embodiments of a ketone, each R is independently selected from methyl, ethyl, and propyl. In certain embodiments, a ketone is selected from propan-2-one, butan-2-one, pentan-2-one, pentan-3-one, and 3-methylbutan-2-one.

In certain embodiments of reaction (ii), a polyformal polyol comprises the reaction product of reactants comprising 2,2'-thiodiethanol, a polyol, and formaldehyde. In certain embodiments of reaction (ii), a polyformal polyol comprises the reaction product of reactants comprising 2,2'-thiodiethanol, a triol, and formaldehyde. In certain embodiments, a polyformal polyol provided by the present disclosure comprises the reaction product of reactants comprising 2,2'-thiodiethanol, formaldehyde, and a triol of Formula (2). In certain embodiments, a polyformal polyol provided by the present disclosure comprises the reaction product of reactants comprising 2,2'-thiodiethanol, formaldehyde, and a triol of Formula (3).

In embodiments in which the one or more polyols used to form polyformal polyols provided by the present disclosure have the same number of hydroxyl groups, the polyformal polyol will have a hydroxyl functionality approximately equivalent to that of the one or more polyols. For example, when a polyol having a hydroxyl functionality of three or a combination of polyols in which each of the polyols in the combination has a hydroxyl functionality of three is used to prepare a polyformal polyol, the polyformal polyol will have a hydroxyl functionality of three. In certain embodiments, a polyformal polyol may have an average hydroxyl functionality of three, four, five, and in certain embodiments, six.

When polyols having different hydroxyl functionalities are used to prepare polyformal polyols, the polyformal polyols can exhibit a range of functionalities. For example, polyformal polyols provided by the present disclosure may have an average hydroxyl functionality from 3 to 12, from 3 to 9, from 3 to 6, from 3 to 4, and in certain embodiments, from 3.1 to 3.5. In certain embodiments, a polyformal polyol having an average hydroxyl functionality from three to four may be prepared by reacting a combination of one or more polyols having a hydroxyl functionality of three and one or more polyols having a hydroxyl functionality of four.

In certain embodiments, polyformal polyols provided by the present disclosure have a hydroxyl number from 10 to 100, from 20 to 80, from 20 to 60, from 20 to 50, and in certain embodiments, from 20 to 40. The hydroxyl number is the hydroxyl content of the polyformal polyol, and may be determined, for example, by acetylating the hydroxyl groups and titrating the resultant acid against potassium hydroxide. The hydroxyl number is the weight of potassium hydroxide in milligrams that will neutralize the acid from one gram of the polyformal polyol.

In certain embodiments, a polyformal polyol provided by the present disclosure has a number average molecular weight from 200 to 6,000 Daltons, from 500 to 5,000 Daltons, from 1,000 to 4,000 Daltons, from 1,500 to 3,500 Daltons, and in certain embodiments, from 2,000 Daltons to 3,000 Daltons.

In certain embodiments, a polyformal polyol comprises a polyformal polyol selected from a polyformal polyol of Formula (4), a polyformal polyol of Formula (5), and a combination thereof:

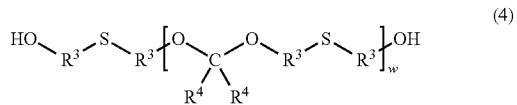
(4)

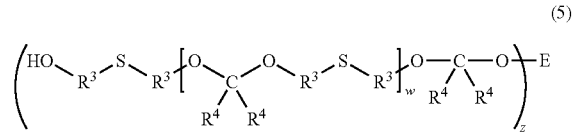
(5)

where w is selected from an integer from 1 to 50; z is selected from an integer from 3 to 6; each R$^3$ is independently selected from C$_{2-6}$ alkanediyl; each R$^4$ is independently selected from hydrogen, C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl; and E represents the core of an z-valent parent polyol E(OH)$_z$.

In certain embodiments of a polyformal polyol of Formula (4) and/or Formula (5), each R$^3$ is ethane-1,2-diyl and each R$^4$ is hydrogen.

In certain embodiments, a polyformal polyol has the structure of Formula (4) and/or Formula (5), where w is selected from an integer from 1 to 50; each R$^3$ is independently C$_{2-6}$ alkanediyl; and each R$^4$ is independently selected from hydrogen, C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl.

In certain embodiments of a polyformal polyol of Formula (4) and/or Formula (5), each R$^3$ is independently selected from C$_{2-6}$ alkanediyl, C$_{2-4}$ alkanediyl, C$_{2-3}$ alkanediyl, and in certain embodiments, ethane-1,2-diyl. In certain embodiments of a polyformal polyol of Formula (4) and/or Formula (5), each R$^3$ is ethane-1,2-diyl.

In certain embodiments of a polyformal polyol of Formula (4) and/or Formula (5), each R$^4$ is independently selected from hydrogen, C$_{1-6}$ alkyl, C$_{1-4}$ alkyl, C$_{1-3}$ alkyl, and in certain embodiments, C$_{1-2}$ alkyl. In certain embodiments of a polyformal polyol of Formula (4) and/or Formula (5), each R$^4$ is hydrogen, in certain embodiments, methyl, and in certain embodiments, ethyl.

In certain embodiments of a polyformal polyol of Formula (4) and/or Formula (5), each R$^3$ is the same and is selected from a C$_{2-3}$ alkanediyl such as ethane-1,2-diyl and propane-1,3-diyl; and each R$^4$ is the same and is selected from hydrogen and C$_{1-3}$ alkyl such as methyl, ethyl, and propyl. In certain embodiments of a polyformal polyol of Formula (4) and/or Formula (5), each R$^3$ is ethane-1,2-diyl. In certain embodiments of a polyformal polyol of Formula (4) and/or Formula (5), each R$^4$ is hydrogen. In certain embodiments of a polyformal polyol of Formula (4) and/or Formula (5), each R$^3$ is ethane-1,2-diyl, and each R$^4$ is hydrogen.

In certain embodiments of a polyformal polyol of Formula (4) and/or Formula (5), w is an integer from 1 to 50, an integer from 2 to 40, an integer from 4 to 30, and in certain embodiments, w is an integer from 7 to 30.

In certain embodiments, a polyformal polyol of Formula (4) and/or Formula (5) has a number average molecular weight from 200 to 6,000 Daltons, from 500 to 5,000 Daltons, from 1,000 to 5,000 Daltons, from 1,500 to 4000 Daltons, and in certain embodiments, from 2,000 to 3,600 Daltons.

In certain embodiments of a polyformal polyol of Formula (5), z is 3, z is 4, z is 5, and in certain embodiments, z is 6.

In certain embodiments of a polyformal polyol of Formula (5) where z is 3, the parent polyol $E(OH)_z$, is a triol of Formula (2):

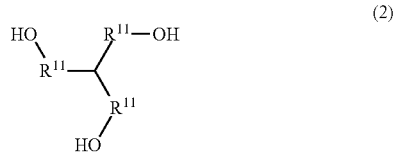

(2)

where each $R^{11}$ is independently $C_{1-6}$ alkanediyl, and in certain embodiments, a triol of Formula (3):

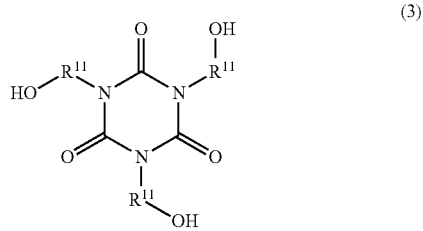

(3)

where each $R^{11}$ is independently $C_{1-6}$ alkanediyl. Accordingly, in these embodiments E has the structure:

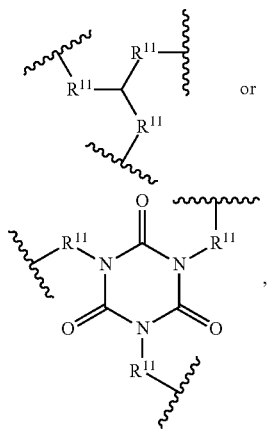

respectively, where each $R^{11}$ is independently $C_{1-6}$ alkanediyl.

A polyformal-isocyanate prepolymer may be formed by reacting a diisocyanate with a polyformal polyol. In certain embodiments, the molar ratio of the diisocyanate to the polyformal polyol is greater than 2 to 1, greater than 2.3 to 1, greater than 2.6 to 1, and in certain embodiments, greater than 3 to 1.

Polyformal-isocyanate prepolymers may be formed by first reacting a polyformal polyol with a diisocyanate to form a diisocyanate-polyformal polyol adduct. The adduct may then be oligomerized by reacting with additional polyformal polyol and diisocyanate to provide a diisocyanate-terminated polyformal oligomer. In certain embodiments, the polyformal-isocyanate prepolymer comprises a combination of unreacted diisocyanate, the 2:1 diisocyanate-polyformal polyol adducct, and the diisocyanate-terminated polyformal oligomer. An example of a reaction sequence using thiodiglycol polyformal and $H_{12}MDI$ to form a $H_{12}MDI$-terminated thiodiglycol polyformal-isocyanate prepolymer is shown in FIG. 1, where w is an integer from 1 to 50, and y is an integer from 2 to 15.

The reaction used to prepare a polyformal polyol may take place in the presence of an acidic catalyst, such as sulfuric acid, sulfonic acid, or a combination thereof. In certain embodiments, a sulfonic acid may be used. Examples of sulfonic acids include alkyl sulfonic acids such as methane sulfonic acid, ethane sulfonic acid tert-butane sulfonic acid, 2-propane sulfonic acid, and cyclohexyl sulfonic acid; alkene sulfonic acids such as α-olefin sulfonic acid, dimerized α-olefin sulfonic acid, and 2-hexene sulfonic acid; aromatic sulfonic acids such as para-toluene sulfonic acids, benzene sulfonic acid, and naphthalene sulfonic acid; and polymer-supported sulfonic acids such as AMBERLYST™ sulfonic acid catalysts available from Dow Chemical.

In certain embodiments, a polyformal-isocyanate prepolymer comprises the reaction products of a polyformal polyol and an aliphatic diisocyanate.

Examples of suitable aliphatic diisocyanates for reacting with a polyformal polyol include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4'-methylene dicyclohexyl diisocyanate ($H_{12}MDI$).

Examples of suitable alicyclic aliphatic diisocyanates for reacting with a polyformal polyol include isophorone diisocyanate (IPDI), cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

In certain embodiments, a polyformal-isocyanate prepolymer comprises the reaction products of a polyformal polyol and an aliphatic diisocyanate selected from IPDI, an HDI trimer, $H_{12}MDI$, and a combination of any of the foregoing. Examples of HDI trimers include, for example, 1,3,5-triazine-2,4,6-(1H,3H,5H)-trione, 1,3,5-tris(6-isocyanatohexyl), DESMODUR® N3300, DESMODUR® N3368, DESMODUR® N3386, DESMODUR® N3390, DESMODUR® N3600, DESMODUR® N3800, DESMODUR® XP2731, DESMODUR® XP2742, DESMODUR® XP2675, and DESMODUR® N2714.

In certain embodiments, a polyformal-isocyanate prepolymer comprises the reaction products of a polyformal polyol and 4,4'-methylene dicyclohexyl diisocyanate ($H_{12}MDI$).

In certain embodiments, an amine comprises a polyamine, such as a diamine. In certain embodiments, an amine curing agent comprises an aromatic diamine such as, for example, dimethylthiotoluenediamine, diethyltoluenediamine, or a combination thereof. In certain embodiments, an aromatic diamine comprises dimethylthiotoluenediamine such as ETHACURE® 300, which comprises 95%-97% dimethylthiotoluene diamine, 2%-3% monomethylthiotoluene diamine, where the dimethylthiotoluene diamine comprises a combination of the 3,5-dimethylthio-2,6-toluene diamine, and 3,5-dimethylthio-2,4-toluene diamine as the major isomer. In certain embodiments, an aromatic diamine comprises diethylthiotoluenediamine such as ETHACURE® 100, which comprises 75%-81% diethyltoluene-2,4-diamine and 18%-20% 3,5-diethyltoluene-2,6-diamine. In certain embodiments, the composition comprises a molar equivalent excess of isocyanate to amine, such as, for example, a molar equivalent excess from 1.01 to 1.2, from 1.02 to 1.1, from 1.02 to 1.08, from 1.03 to 1.07, and in certain embodiments, 1.05.

In certain embodiments, a composition provided by the present disclosure comprises a polyformal-isocyanate prepolymer comprising the reaction products of reactants comprising a polyformal polyol and a first diisocyanate, a polythioether-isocyanate prepolymer comprising the reaction products of reactants comprising a polythioether polyol and a second diisocyanate, and a curing agent comprising an amine.

In certain embodiments, a polythioether polyol comprises a polythioether polyol selected from a polythioether diol, a polythioether triol, and a combination thereof. In certain embodiments, a polythioether polyol comprises a combination of a polythioether diol and a polythioether triol.

A polythioether polyol refers to a polythioether having terminal hydroxyl groups. As used herein, the term "polythioether" refers to a compound containing at least two thioether linkages, that is "—$CR_2$—S—$CR_2$—" groups. In certain embodiments, such compounds are polymers. As used herein, "polymer" refers to oligomers and both homopolymers and copolymers. Unless stated otherwise, molecular weights are number average molecular weights for polymeric materials indicated as "Mn" as may be determined, for example, by gel permeation chromatography using a polystyrene standard in an art-recognized manner.

In certain embodiments, the polythioether polyol comprises a polyol selected from a polythioether polyol of Formula (6); a polythioether polyol of Formula (7), and a combination thereof:

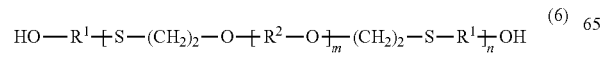
(6)

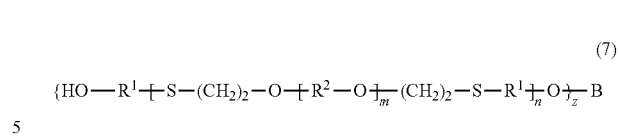

where each $R^1$ is independently selected from $C_{2-6}$ alkanediyl, $C_{6-8}$ cycloalkanediyl, $C_{6-10}$ alkanecycloalkanediyl, —[(—$CH_2$—)$_p$—X—]$_q$—(—$CH_2$—)$_r$—, and —[(—$CH_2$—)$_p$—X—]$_q$—(—$CH_2$—)$_r$—, wherein at least one —$CH_2$— group is substituted with a methyl group; each $R^2$ is independently selected from $C_{2-6}$ alkanediyl, $C_{6-8}$ cycloalkanediyl, $C_{6-10}$ alkanecycloalkanediyl, and —[(—$CH_2$—)$_p$—X—]$_q$—(—$CH_2$—)$_r$—; X is selected from —O—, —S— and —$NR^{10}$—, where $R^{10}$ is selected from hydrogen and methyl; Z represents the core of an z-valent polyfunctionalizing agent $B(R^8)_z$, where each $R^8$ is a group that is reactive with a terminal —SH and/or a terminal —CH=$CH_2$ group; each m is independently selected from a rational number from 0 to 10; each n is independently selected from an integer from 1 to 60; each p is independently selected from an integer from 2 to 6; each q is independently selected from an integer from 0 to 5; each r is independently selected from an integer from 2 to 10; and z is selected from an integer from 3 to 6. In certain embodiments, B represents the core of a polyfunctionalizing agent such as those disclosed in U.S. Pat. Nos. 4,366,307; 4,609,762; and 5,225,472, where a polyfunctionalizing agent refers to a compound having three or more moieties that are reactive with terminal —SH and/or a terminal —CH=$CH_2$ groups.

Polythioether polyols of Formula (6) and Formula (7) are generally disclosed, for example, in U.S. Pat. No. 6,172,179, which is incorporated by reference in its entirety.

A polythioether polyol may comprise a polythioether diol, a polythioether triol, a polythioether polyol having a functionality from 4 to 6, or a combination of any of the foregoing. In certain embodiments, a polythioether polyol comprises a combination of a polythioether diol and a polythioether triol. For example, in certain embodiments, a polythioether polyol comprises a combination of a polythioether diol of Formula (9):

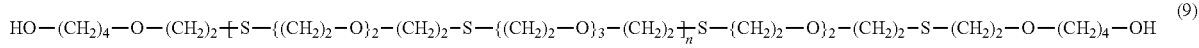
(9)

and a polythioether triol of Formula (10):

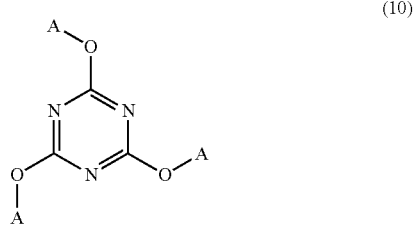
(10)

where each A is a moiety of Formula (11):

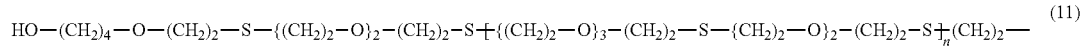

where n is selected from an integer from 1 to 60, and in certain embodiments, an integer from 7 to 30.

In certain embodiments, polythioether polyols comprise a structure having Formula (12):

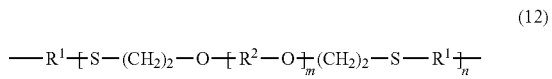

where:

each $R^1$ is independently selected from $C_{2-6}$ alkanediyl, $C_{6-8}$ cycloalkanediyl, $C_{6-10}$ alkanecycloalkanediyl, $-[(-CH_2-)_p-X-]_q-(-CH_2-)_r-$, and $-[(-CH_2-)_p-X-]_q-(-CH_2-)_r-$, where at least one $-CH_2-$ group is substituted with a methyl group;

each $R^2$ is independently selected from $C_{2-6}$ alkanediyl, $C_{6-8}$ cycloalkanediyl, $C_{6-10}$ alkanecycloalkanediyl, and $-[(-CH_2-)_p-X-]_q-(-CH_2-)_r-$;

each X is selected from $-O-$, $-S-$ and $-NR^{10}-$, wherein $R^{10}$ is selected from hydrogen and methyl;

each m is independently selected from a rational number from 0 to 10;

each n is independently selected from an integer from 1 to 60;

each p is independently selected from an integer from 2 to 6;

each q is independently selected from an integer from 0 to 5; and each r is independently selected from an integer from 2 to 10.

In certain embodiments, a polythioether polyol comprises a polythioether polyol of Formula (13):

$$R^4-[R^3]_y-A-[R^3]_y-R^4 \quad (13)$$

where:

A has the structure of Formula (12);

each y is independently selected from 0 and 1;

each $R^3$ is a single bond where y is 0; or each $R^3$ is independently $-S-(CH_2)_2-[-O-R^2-]_m-O-$ where y is 1;

each $R^4$ is independently $-S-(CH_2)_{2+s}-O-R^5$ where y is 0; or each $R^4$ is independently $-(CH_2)_2-S-R^5$ where y is 1;

each m is independently selected from a rational number from 0 to 10;

each s is independently selected from an integer from 0 to 10; and each $R^5$ is independently $-(CH_2)_t-OH$ where each t is independently selected from an integer from 1 to 6.

In certain embodiments, a polythioether polyol comprises a polythioether polyol of Formula (14):

$$B-(A-[R^3]_y-R^4)_z \quad (14)$$

where:

each A independently has the structure of Formula (12);

each y is independently selected from 0 and 1;

each $R^3$ is a single bond where y is 0; or each $R^3$ is independently $-S-(CH_2)_2-[-O-R^2-]_m-O-$ where y is 1;

each $R^4$ is independently $-S-(CH_2)_{2+s}-O-R^5$ where y is 0; or each $R^4$ is independently $-(CH_2)_2-S-R^5$ where y is 1;

each $R^5$ is independently $-(CH_2)_t-OH$ where each t is independently selected from an integer from 1 to 6;

each m is independently selected from a rational number from 0 to 10;

each s is independently selected from an integer from 0 to 10;

z is independently selected from an integer from 3 to 6; and

B is a z-valent residue of a polyfunctionalizing agent $B(R^8)_z$, where each $R^8$ is a moiety that is reactive with a terminal $-SH$ and/or a terminal $-CH=CH_2$ group.

In certain embodiments, a polythioether polyol comprises a combination of a polythioether polyol of Formula (13) and a polythioether polyol of Formula (14).

In certain embodiments, a polythioether polyol comprises the reaction products of a thiol-terminated polythioether and a hydroxyl-functional vinyl ether. The preparation of thiol-terminated polythioethers is disclosed, for example, in U.S. Pat. No. 6,172,179.

For example, in certain embodiments, a thiol-terminated polythioether may be prepared by reacting (n+1) moles of one or more dithiols of Formula (15):

$$HS-R^1-SH \quad (15)$$

where $R^1$ is defined as for Formula (12); with (n) moles one or more divinyl ethers of Formula (16):

$$CH_2=CH-O-[-R^2-O-]_m-CH=CH_2 \quad (16)$$

where $R^2$ and m are defined as for Formula (12); in the presence of a suitable catalyst. In certain embodiments, a thiol-terminated polythioether comprises the products of the foregoing reaction.

Compounds of Formula (15) are dithiols. In certain embodiments of a dithiol, $R^1$ is a $C_{2-6}$ n-alkanediyl such as, 1,2-ethanedithiol, 1,3-propanedithiol, 1,4-butanedithiol, 1,5-pentanedithiol, and 1,6-hexanedithiol.

In certain embodiments of a dithiol of Formula (15), $R^1$ is a $C_{3-6}$ branched alkanediyl group, having one or more pendent groups which can be, for example, methyl or ethyl groups. In certain embodiments of a dithiol in which $R^1$ is branched alkanediyl, the dithiol is selected from 1,2-propanedithiol, 1,3-butanedithiol, 2,3-butanedithiol, 1,3-pentanedithiol, and 1,3-dithio-3-methylbutane. Other suitable dithiols include compounds of Formula (15) in which $R^1$ is a $C_{6-8}$ cycloalkanediyl or $C_{6-10}$ alkylcycloalkanediyl, for example, dipentenedimercaptan or ethylcyclohexyldithiol (ECHDT).

In certain embodiments, a dithiol includes one or more heteroatom substituents in the carbon backbone, for example, dithiols in which X is a heteroatom such as O, S or another bivalent heteroatom radical; a secondary or tertiary amine group, i.e., $-NR^6-$, where $R^6$ is hydrogen or methyl; or another substituted trivalent heteroatom. In certain embodiments of a dithiol, X is O or S, such that $R^1$ is, for example, $-[(-CH_2-)_p-O-]_q-(-CH_2-)_r-$ or $-[(-CH_2-)_p-S-]_q-(-CH_2-)_r-$. In certain embodiments of a dithiol, p and r are the same, and in certain embodiments, each of p and r is 2. In certain embodiments, a dithiol is selected from dimercaptodiethylsulfide (DMDS), dimercaptodioxaoctane (DMDO), and 1,5-dithia-3-oxapentane. In certain embodiments of a dithiol, the dithiol includes heteroatom substituents in the carbon backbone and includes a pendent alkyl group, such as a methyl group. In certain embodiments, a dithiol is selected from methyl-substituted DMDS, such as HS—$CH_2CH(CH_3)$—S—$CH_2CH_2$—SH, HS—CH($CH_3$)$CH_2$—S—$CH_2CH_2$—SH, and dimethyl-substituted DMDS such as HS—$CH_2CH(CH_3)$—S—$CH(CH_3)CH_2$—SH and HS—$CH(CH_3)CH_2$—S—$CH_2CH(CH_3)$—SH.

Compounds of Formula (16) are divinyl ethers. Divinyl ether itself (m is 0) can be used. In certain embodiments, divinyl ethers include compounds having at least one oxyalkanediyl group, and in certain embodiments, from 1 to 4 oxyalkanediyl groups (i.e., compounds in which m is selected from an integer from 1 to 4). In certain embodiments of a compound of Formula (16), m is selected from an integer from 2 to 4. It is also possible to employ commercially available divinyl ether mixtures in producing polythioethers according to the present disclosure. Such mixtures may be characterized by a non-integral average value for the number of alkoxy units per molecule. Thus, m in Formula (16) may also take on non-integral, rational values between 0 and 10, in certain embodiments, between 1 and 10, in certain embodiments, between 1 and 4, and in certain embodiments, between 2 and 4.

Examples of suitable divinyl ethers include compounds in which $R^2$ is $C_{2-6}$ alkanediyl such as, for example, ethylene glycol divinyl ether (EG-DVE); butanediol divinyl ether (BD-DVE); hexanediol divinyl ether (HD-DVE); diethylene glycol divinyl ether (DEG-DVE)); triethylene glycol divinyl ether; and tetraethylene glycol divinyl ether. Suitable divinyl ether blends include PLURIOL®-type blends such as PLURIOL® E-200 divinyl ether (commercially available from BASF), and DPE polymeric blends such as DPE-2 and DPE-3 (commercially available from International Specialty Products, Wayne, N.J.). In certain embodiments, a divinyl ether of Formula (16) is selected from DEG-DVE and PLURIOL® E-200. Divinyl ethers in which $R^2$ is $C_{2-6}$ branched alkanediyl may be prepared by reacting a polyhydroxy compound with acetylene. Examples of these divinyl ethers include compounds in which $R^2$ is an alkyl-substituted methylene group such as —$CH(CH_3)$— and an alkyl-substituted ethylene such as —$CH_2CH(CH_3)$—.

In certain embodiments, a thiol-terminated polythioether may be prepared by reacting (n+1) moles of a compound of one or more divinyl ethers of Formula (16); and (n) moles of one or more dithiols of Formula (15); in the presence of appropriate suitable catalyst. In certain embodiments, a thiol-terminated polythioether comprises the products of the foregoing reaction.

In certain embodiments, a thiol-terminated polythioether may be prepared by reacting (n+1) moles of a compound of one or more dithiols of Formula (15); and (n) moles of one or more divinyl ethers of Formula (16); in the presence of appropriate suitable catalyst. In certain embodiments, a thiol-terminated polythioether comprises the products of the foregoing reaction.

Polyfunctional thiol-terminated polythioethers may be prepared, for example, by reacting (n+1) moles of one or more dithiols of Formula (15); (n) moles of one or more divinyl ethers of Formula (16); and one or more z-valent polyfunctionalizing agents; in the presence of a suitable catalyst. In certain embodiments, a polyfunctional thiol-terminated polythioether comprises the products of the foregoing reaction.

A polyfunctionalizing agent is a compound having more than two moieties, such as from 3 to 6 moieties, that are reactive with terminal —SH and/or terminal —CH=$CH_2$ groups. A polyfunctionalizing agent may be represented by Formula (17):

$$B—(R^8)_z \qquad (17)$$

where each $R^8$ is independently selected from a group that is reactive with terminal —SH and/or terminal —CH=$CH_2$ groups, and z is selected from an integer from 3 to 6. Examples of polyfunctionalizing agents include triallylcyanurate (TAC) and 1,2,3-propanetrithiol. Other suitable polyfunctionalizing agents include trimethylolpropane trivinyl ether, and the polythiols disclosed in U.S. Pat. Nos. 4,366,307, 4,609,762, 5,225,472, and 6,172,179.

In certain embodiments, polyfunctional thiol-terminated polythioethers may also be prepared by reacting (n) moles of one or more dithiols of Formula (15); (n+1) moles of one or more divinyl ethers of Formula (16); and one or more z-valent polyfunctionalizing agent; in the presence of a suitable catalyst. In certain embodiments, a thiol-terminated polythioether comprises the products of the foregoing reaction.

In certain embodiments, thiol-terminated polythioether may be prepared by reacting one or more dithiols of Formula (15); one or more divinyl ethers of Formula (16); and one or more polyfunctionalizing agents; in the presence of a suitable catalyst, at a temperature, for example, from 30° C. to 120° C. for 2 hours to 24 hours. In certain embodiments, a thiol-terminated polythioether comprises the products of the foregoing reaction.

A thiol-terminated polythioether may then be reacted with a hydroxy-functional vinyl ether to provide a polythioether polyol. Examples of suitable hydroxy-functional vinyl ethers useful for reacting with thiol-terminated polythioethers include triethylene glycol monovinyl ether, 1,4-cyclohexane dimethylol monovinyl ether, 1-methyl-3-hydroxypropyl vinyl ether, 4-hydroxybutyl vinyl ether, and a combination of any of the foregoing. In certain embodiments, the hydroxy-functional vinyl ether is 4-hydroxybutyl vinyl ether.

In certain embodiments, the polythioether polyol comprises from 60% to 95% of a polythioether diol, and from 5% to 40% of a polythioether triol, where percent refers to molar percent. In certain embodiments, the polythioether polyol comprises from 70% to 90% of a polythioether diol, and from 10% to 30% of a polythioether triol, where percent refers to molar percent. In certain embodiments, the polythioether polyol comprises from 75% to 85% of a polythioether diol, and from 15% to 25% of a polythioether triol, where percent refers to molar percent. In certain embodiments, the polythioether polyol comprises 80% of a polythioether diol, and from 20% of a polythioether triol, where percent refers to molar percent.

In certain embodiments, the polythioether polyol comprises from 60% to 95% of a polythioether diol of Formula (10), and from 5% to 40% of a polythioether triol of Formula (11), where percent refers to molar percent. In certain embodiments, the polythioether polyol comprises from 70% to 90% of a polythioether diol of Formula (10), and from 10% to 30% of a polythioether triol of Formula (11), where percent refers to molar percent. In certain embodiments, the polythioether polyol comprises from 75% to 85% of a polythioether diol of Formula (10), and from 15% to 25% of a polythioether triol of Formula (11), where percent refers to molar percent. In certain embodiments, the polythioether polyol comprises 80% of a polythioether diol of Formula (10), and from 20% of a polythioether triol of Formula (11), where percent refers to molar percent.

In certain embodiments, polythioether polyols provided by the present disclosure have a hydroxyl number from 10 to 100, from 20 to 100, from 20 to 80, from 20 to 60, and in certain embodiments, from 20 to 40. The hydroxyl number is the hydroxyl content of the polythioether polyol, and may be determined, for example, by acetylating the hydroxyl groups and titrating the resultant acid against potassium hydroxide. The hydroxyl number is the weight of potassium hydroxide in milligrams that will neutralize the acid from one gram of the polythioether polyol.

In certain embodiments, polythioether polyols provided by the present disclosure have a number average molecular weight from 200 to 6,000 Daltons, from 500 to 5,000 Daltons, from 1,000 to 4,000 Daltons, from 1,500 to 3,500 Daltons, and in certain embodiments, from 2,000 Daltons to 3,000 Daltons.

A polythioether polyol provided by the present disclosure may comprise from 50% to 90% of a polythioether diol and from 10% to 50% of a polythioether triol, and in certain embodiments from 70% to 90% of a polythioether diol and from 10% to 30% of a polythioether triol. In certain embodiments, the polythioether polyol comprises a combination of polythioether polyols comprising from 70% to 90% of a polythioether diol of Formula (6) and from 10% to 30% of a polythioether triol of Formula (7), where wt % is based on the total functionality of the polythioether polyol. In certain embodiments, the polythioether polyol comprises a combination of polythioether polyols comprising from 70% to 90% of a polythioether diol of Formula (10) and from 10% to 30% of a polythioether triol of Formula (11), where wt % is based on the total functionality of the polythioether polyol.

In certain embodiments, a polythioether polyol comprises a combination of polythioether polyols and the average functionality of the combination of polythioether polyols is from 2.1 to 4, from 3 to 4, from 2.5 to 3.5, and in certain embodiments, from 2.1 to 2.5.

A polythioether-isocyanate prepolymer may be formed by reacting a diisocyanate with a polythioether polyol. In certain embodiments, the molar ratio of diisocyanate to polythioether polyol is greater than 2 to 1, greater than 2.3 to 1, greater than 2.6 to 1, and in certain embodiments, greater than 3 to 1.

In certain embodiments, a polythioether-isocyanate prepolymer comprises the reaction products of a polythioether polyol and an aliphatic diisocyanate.

Examples of suitable aliphatic diisocyanates for reacting with a polythioether polyol include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate ($H_{12}MDI$).

Examples of suitable alicyclic aliphatic diisocyanates for reacting with a polythioether polyol include isophorone diisocyanate (IPDI), cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

In certain embodiments, a polythioether-isocyanate prepolymer comprises the reaction products of a polythioether polyol and an aliphatic diisocyanate selected from IPDI, an HDI trimer, $H_{12}MDI$, and a combination of any of the foregoing.

In certain embodiments, a polythioether-isocyanate prepolymer comprises the reaction products of a polythioether polyol and 4,4'-methylene dicyclohexyl diisocyanate ($H_{12}MDI$). In certain embodiments, a polythioether-isocyanate prepolymer comprises the reaction products of a 80 wt %/20 wt % combination of a polythioether diol of Formula (10) and a polythioether triol of Formula (11) and 4,4'-methylene dicyclohexyl diisocyanate ($H_{12}MDI$). In certain embodiments, a polythioether-isocyanate prepolymer comprises the reaction products of the 2:1 thio-ene adduct of 4-hydroxybutyl vinyl ether and a 80 wt %/20 wt % combination of a polythioether diol of Formula (10) and a polythioether triol of Formula (11) and 4,4'-methylene dicyclohexyl diisocyanate ($H_{12}MDI$).

The first and second diisocyanates may be the same or different. In certain embodiments, the first and second diisocyanates comprise one or more aliphatic diisocyanates. In certain embodiments, the first and second diisocyanates are selected from IPDI, an HDI trimer, $H_{12}MDI$, and a combination of any of the foregoing. In certain embodiments, both the first diisocyanate and the second diisocyanate comprise 4,4'-methylene dicyclohexyl diisocyanate ($H_{12}MDI$).

Polythioether polyols may be prepared, for example, by reacting a thiol-terminated polythioether with a hydroxy-functional vinyl ether to provide a polythioether polyol. In certain embodiments, the thiol-terminated polythioether may comprise a thiol-terminated polythioether selected from a polythioether dithiol, a polythioether trithiol, and a combination thereof. In certain embodiments, the thiol-terminated polythioether is any of the thiol-terminated polythioethers or combinations thereof disclosed in U.S. Pat. No. 6,172,179, which is incorporated by reference in its entirety. In certain embodiments, the thiol-terminated polythioether is a combination of polythioether dithiols and polythioether trithiols, such as, for example, Permapol® 3.1E (available from PRC-DeSoto International). In certain embodiments, the thiol-terminated polythioether comprises the reaction product of one or more dithiols of Formula (15); one or more divinyl ethers of Formula (16); and one or more polyfunctionalizing agents. The polythioether polyol may then be reacted with a diisocyanate, such as 4,4'-methylene dicyclohexyl diisocyanate ($H_{12}MDI$) to provide the polythioether-isocyanate prepolymer.

In certain embodiments, compositions provided by the present disclosure comprise a catalyst such as an amine catalyst, an organometallic catalyst, or an acid catalyst. Examples of suitable amine catalysts include, for example, triethylenediamine (1,4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine. Examples of suitable organometallic catalysts include, for example, mercury, lead, tin (dibutyltin dilaurate, dibutyltin oxide, dioctyltin mercaptide), and bismuth (bismuth octanoate). In certain embodiments, compositions provided by the present disclosure comprise a carboxylic acid catalyst such as, for example, formic acid (methanoic acid), acetic acid (ethanoic acid), propionic acid (propanoic acid), butyric acid (butanoic acid), valeric acid (pentanoic acid), caproic acid (hexanoic acid), enanthic acid (heptanoic acid), caprylic acid (heptanoic acid), pelargonic acid (nonanoic acid), capric acid (decanoic acid), or a combination of any of the foregoing. In certain embodiments, compositions provided by the present disclosure comprise pelargonic acid.

In certain embodiments, a composition comprises the reaction products of reactants comprising a polyformal-isocyanate prepolymer comprising the reaction products of a polyformal polyol and a first aliphatic diisocyanate; a polythioether-isocyanate prepolymer comprising the reaction products of a polythioether polyol and a second aliphatic diisocyanate; and an aromatic diamine. In certain embodiments, the first diisocyanate and the second diisocyanate comprise $H_{12}MDI$, and in certain embodiments, the aromatic diamine comprises dimethylthiotoluenediamine.

In certain embodiments, a composition comprises the reaction products of reactants comprising (a) a polythioether-isocyanate prepolymer comprising the reaction products of a polythioether polyol and $H_{12}MDI$, where the polythioether polyol comprises the reaction products of Permapol® P3.1E and hydroxybutyl vinyl ether; and the molar ratio of the $H_{12}MDI$ to the polythioether polyol is greater than 2 to 1; (b) a polyformal-isocyanate prepolymer comprising the reaction products of a polyformal diol of Formula (18) and $H_{12}MDI$;

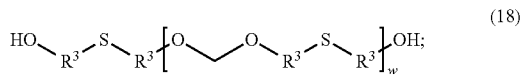

(18)

wherein w is selected from an integer from 1 to 50; each $R^3$ is ethane-1,2-diyl; and the molar ratio of the $H_{12}MDI$ to the polyformal diol is greater than 2 to 1; and (c) an aromatic diamine selected from diethyltoluenediamine, dimethylthiotoluenediamine, and a combination thereof.

In certain embodiments of the above composition, w in a polyformal diol of Formula (18) may be from 7 to 30. In certain embodiments of the above composition, the composition comprises from 70 wt % to 90 wt % of the polythioether-isocyanate prepolymer and from 10 wt % to 30 wt % of the polyformal-isocyanate prepolymer, where wt % is based on the total weight percent of the prepolymers in the composition. In certain embodiments of the above composition, the composition comprises from 45 wt % to 85 wt % of the polythioether-isocyanate prepolymer and from 15 wt % to 55 wt % of the polyformal-isocyanate prepolymer, where wt % is based on the total weight of the polythioether-isocyanate prepolymer and the polyformal-isocyanate prepolymer in the composition. In certain embodiments of the above composition, the composition comprises from 55 wt % to 75 wt % of the polythioether-isocyanate prepolymer and from 25 wt % to 45 wt % of the polyformal-isocyanate prepolymer, where wt % is based on the total weight of the polythioether-isocyanate prepolymer and the polyformal-isocyanate prepolymer in the composition. In certain embodiments of the above composition, the aromatic diamine comprises dimethylthiotoluenediamine such as ETHACURE® 300.

In certain embodiments, compositions provided by the present disclosure comprise from 45 wt % to 85 wt % of a polythioether-isocyanate prepolymer and from 15 wt % to 55 wt % of a polyformal-isocyanate prepolymer, where wt % is based on the total weight of the polythioether-isocyanate prepolymer and the polyformal-isocyanate prepolymer in the composition. In certain embodiments, compositions provided by the present disclosure comprise from 55 wt % to 75 wt % of polythioether-isocyanate prepolymer and from 25 wt % to 45 wt % of a polyformal-isocyanate prepolymer, where wt % is based on the total weight of the polythioether-isocyanate prepolymer and the polyformal-isocyanate prepolymer in the composition.

In certain embodiments, compositions provided by the present disclosure comprise at least one filler, such as a filler that is effective in reducing the specific gravity of the composition. In certain embodiments, the specific gravity of a composition is from 0.8 to 1, 0.7 to 0.9, from 0.75 to 0.85, and in certain embodiments, is 0.8. Suitable fillers for decreasing the specific gravity of the composition include, for example, hollow microspheres such as Expancel microspheres (available from AkzoNobel) or DUALITE® low density polymer microspheres (available from Henkel).

Composition Properties

In certain embodiments, polythioether-isocyanate prepolymers and polyformal-isocyanate prepolymers provided by the present disclosure are liquid at room temperature. In certain embodiments, the prepolymers have a viscosity, at 100% solids, of no more than about 500 poise, such as 10 to 300 poise or, in some cases, 100 to 200 poise, at a temperature of 25° C. and a pressure of 760 mm Hg determined according to ASTM D-2849 §79-90 using a Brookfield CAP 2000 viscometer.

Uses

Compositions provided by the present disclosure may be used as sealants, coatings, and/or electrical potting compositions. A sealant composition refers to a composition that is capable of producing a film that has the ability to resist atmospheric conditions, such as moisture and temperature and at least partially block the transmission of materials, such as water, fuel, and other liquid and gasses. In certain embodiments, sealant compositions of the present invention are useful, for example, as aerospace sealants and linings for fuel tanks.

In certain embodiments, compositions provided by the present disclosure comprise from 10 wt % to 90 wt % of polythioether-isocyanate prepolymer and a polyformal-isocyanate prepolymer provided by the present disclosure, from 20 wt % to 80 wt %, from 30 wt % to 70 wt %, and in certain embodiments, from 40 wt % to 60 wt %, where wt % is based on the total weight of all non-volatile components of the composition (i.e., the dry weight). In certain embodiments, compositions provided by the present disclosure comprise from 10 wt % to 90 wt % of a polythioether-isocyanate prepolymer and a polyformal-isocyanate prepolymer provided by the present disclosure, from 20 wt % to 90 wt %, from 30 wt % to 90 wt %, from 40 wt % to 90 wt %, from 50 wt % to 90 wt %, from 60 wt % to 90 wt %, from 70 wt % to 90 wt %, and in certain embodiments from 80 wt % to 90 wt %, where wt % is based on the total weight of all non-volatile components of the composition (i.e., the dry weight).

Compositions provided by the present disclosure may comprise one or more different types of filler. Suitable fillers include those commonly known in the art, including inorganic fillers, such as carbon black and calcium carbonate (CaCO₃), and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition.

As can be appreciated, polythioether-isocyanate prepolymers, polyformal-isocyanate prepolymers, amines, and fillers employed in a composition, as well as any additives, may be selected so as to be compatible with each other.

Compositions provided by the present disclosure may include one or more colorants, thixotropic agents, accelerators, retardants, adhesion promoters, solvents, masking agents, or a combination of any of the foregoing.

As used herein, the term "colorant" means any substance that imparts color and/or other opacity and/or other visual effect to the composition. A colorant can be of any suitable form, such as discrete particles, dispersions, solutions, and/or flakes. A single colorant or a combination of two or more colorants can be used in a composition.

Examples of colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into a composition by use of a grind vehicle, such as an acrylic grind vehicle. Examples of pigments and/or pigment compositions include carbazole dioxazine crude pigment, azo, monoazo, diazo, naphthol AS, salt type (flakes), benzimidazolone, isoindolinone, isoindoline, polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red (DPPBO red), titanium dioxide, carbon black, and combinations of any of the foregoing. Examples of dyes include those that are solvent- and/or aqueous-based such as phthalo green or blue, iron oxide, bismuth vanadate, anthraquinone, perylene, and quinacridone. Examples of tints include pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, a colorant may be in the form of a dispersion including, for example, a nanoparticle dispersion. Nanoparticle dispersions may include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Examples of nanoparticle dispersions and methods for making them are disclosed in U.S. Pat. No. 6,875,800. Nanoparticle dispersions may also be produced by crystallization, precipitation, gas phase condensation, and/or chemical attrition (i.e., partial dissolution). To minimize re-agglomeration of nanoparticles within the coating, a dispersion of resin-coated nanoparticles may be used. As used herein, a "dispersion of resin-coated nanoparticles" refers to a continuous phase in which are dispersed discreet "composite microparticles" that comprise a nanoparticle and a resin coating on the nanoparticle. Examples of dispersions containing resin-coated nanoparticles and methods for making them are disclosed in U.S. Pat. No. 7,438,972.

Examples of special effect compositions that may be used in compositions provided by the present disclosure include pigments and/or compositions that produce one or more appearance effects such as reflectance, pearlescence, metallic sheen, phosphorescence, fluorescence, photochromism, photosensitivity, thermochromism, goniochromism, and/or color-change. Additional special effect compositions can provide other perceivable properties, such as opacity or texture. In certain embodiments, special effect compositions may produce a color shift, such that the color of a composition changes when the coating is viewed at different angles. Examples of color effect compositions are disclosed in U.S. Pat. No. 6,894,086. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air. In general, a colorant may comprise from 1 wt % to 65 wt % of a composition, from 2 wt % to 50 wt %, such as from 3 wt % to 40 wt %, or from 5 wt % to 35 wt %, with weight percent based on the total dry weight of the composition.

Thixotropes, for example, silica, may be used in an amount from 0.1 wt % to 5 wt %, based on the total dry weight of the composition.

Accelerants may be present in an amount from 0.1 to 5 weight percent, based on the total weight of the composition. Examples of suitable accelerants include 1,4-diazabicyclo[2.2.2]octane (DABCO®, Air Products, Chemical Additives Division) and DMP-30® (an accelerant composition including 2,4,6-tris(dimethylaminomethyl)phenol).

Adhesion promoters, may be present in amount from 0.1 wt % to 15 wt % of a composition, based on the total dry weight of the composition. Examples of adhesion promoters include phenolics, such as METHYLON® phenolic resin available from Occidental Chemicals, and organosilanes, such as epoxy, mercapto or amino functional silanes, such as SILQUEST® A-187 and SILQUEST® A-1100 available from Momentive Performance Materials.

Masking agents, such as pine fragrance or other scents, which may be useful in masking any low level odor of the composition, may be present in an amount from 0.1 wt % to 1 wt %, based on the total dry weight of the composition.

In certain embodiments, compositions provided by the present disclosure may comprise a plasticizer that may facilitate the use of prepolymers having a higher glass transition temperature, $T_g$, than would ordinarily be useful in an aerospace sealant. For example, use of a plasticizer may effectively reduce the $T_g$ of a composition, and thereby increase the low-temperature flexibility of the cured polymerizable composition beyond that which would be expected on the basis of the $T_g$ of the prepolymers alone. Plasticizers suitable in certain embodiments of the compositions include, for example, phthalate esters, chlorinated paraffins, and hydrogenated terphenyls. A plasticizer or combination of plasticizers may constitute from 1 wt % to 40 wt % of a composition, or from 1 wt % to 10 wt % of a composition. In certain embodiments, a composition may comprise one or more organic solvents, such as isopropyl alcohol, in an amount, for example, from 0 wt % to 15 wt %, from 0 wt % to 10 wt %, or from 0 wt % to 5 wt %, based on the non-dry weight of the composition.

In certain embodiments, compositions provided by the present disclosure are substantially free or, in some cases, completely free, of any solvent, such as an organic solvent or an aqueous solvent, i.e., water. Stated differently, in certain embodiments, compositions provided by the present disclosure are substantially 100% solids.

In certain embodiments, compositions, such as sealant compositions, may be provided as multi-pack compositions, such as two-pack compositions, wherein one package comprises one or more prepolymers provided by the present disclosure and a second package comprises one or more amine curing agents for the one or more prepolymers. Additives and/or other materials may be added to either package as desired or necessary. The two packages may be combined and mixed prior to use. In certain embodiments, the pot life of the one or more mixed prepolymers and curing agent is at least 30 minutes, at least 1 hour, at least 2 hours, and in certain embodiments, more than 2 hours, where pot life refers to the period of time the mixed composition remains suitable for use as a sealant after mixing.

Compositions provided by the present disclosure may be applied to any of a variety of substrates. Examples of substrates to which the composition may be applied include metals such as titanium, stainless steel, and aluminum, which may be anodized, primed, organic-coated or chromate-coated; epoxy; urethane; graphite; fiberglass composite; KEVLAR®; acrylics; and polycarbonates.

Compositions provided by the present disclosure may be applied directly onto the surface of a substrate or over an underlayer by any suitable coating process known to those of ordinary skill in the art.

In certain embodiments, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification. Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provide a cured product, such as a sealant, exhibiting an elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, exhibit a lap shear strength of greater than 200 psi and in some cases at least 400 psi when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% RH to 100% RH. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation such as ultraviolet radiation. As will also be appreciated, the methods may be used to seal apertures on aerospace vehicles.

EXAMPLES

Embodiments provided by the present disclosure are further illustrated by reference to the following examples, which describe the synthesis, properties, and uses of polythioether polyols and prepolymers thereof, polyformal polyols and prepolymers thereof, and compositions of any of the foregoing. It will be apparent to those skilled in the art that many modifications, both to materials, and methods, may be practiced without departing from the scope of the disclosure.

Example 1

Polyformal Polyol

Thiodiglycol (1,833 g), paraformaldehyde (95% purity) (360 g), AMBERLYST™ 15 (319 g, available from Dow Chemical Company), and toluene (1,000 mL) were charged into a 5-L, 4-neck, round-bottom flask. The flask was equipped with a heating mantle, thermocouple, temperature controller, and a Dean-Stark adapter fitted with a reflux condenser, dropping funnel, and an inlet for nitrogen positive pressure. The reactants were stirred under nitrogen, heated to 118° C., and maintained at 118° C. for ca. 7 h. During this period, collected water was periodically removed from the Dean-Stark adapter. The reaction mixture was then cooled to room temperature and filtered through a coarse-fitted Buchner funnel (600 mL volume) with a 9.0 cm diameter Whatman GF/A filter paper over the frit. The flask and filter cake were washed with 500 mL toluene. A filtrate was obtained. The filtrate was then dried in vacuo using a 2-L round bottomed flask (rotary evaporator, 7 torr final vacuum, 90° C. water bath) to provide a yellow, viscous polymer (1,456 g). The resulting thiodiglycol polyformal polyol had a hydroxyl number of 34.5 and a viscosity of 92 poise.

Example 2

$H_{12}$MDI-Terminated Polyformal-Isocyanate Prepolymer

The thiodiglycol polyformal polyol of Example 1 (450 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of DESMODUR® W ($H_{12}$MDI) (99.5 g) and a 0.01% solution of dibutyltin dilaurate dissolved in methyl ethyl ketone (5.50 g). The reaction mixture was maintained at 76.6° C. for 7 h and then cooled to room temperature. A 1% solution of benzyl chloride dissolved in methyl ethyl ketone (5.50 g) was then added to the reaction mixture. The resulting thiodiglycol polyformal-isocyanate prepolymer had an isocyanate content of 3.73% and a viscosity of 356 poise.

Example 3

HDI-Uretidione-Terminated Polyformal-Isocyanate Prepolymer

The thiodiglycol polyformal polyol of Example 1 (101 g) was charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of DESMO-DUR® XP-2730 (HDI-uretidione aliphatic polyisocyanate) (33.4 g) and a 0.01% solution of dibutyltin dilaurate dissolved in methyl ethyl ketone (1.4 g). The reaction mixture was maintained at 76.6° C. for ca. 7 h and then cooled to room temperature. A 1% solution of benzyl chloride dissolved in methyl ethyl ketone (1.4 g) was then added to the reaction mixture. The resulting prepolymer had an isocyanate content of 3.41% and a viscosity of 695 poise.

Example 4

HDI-Uretidione-Terminated Polyformal-Isocyanate Prepolymer

The thiodiglycol polyformal polyol of Example 1 (400 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of DESMO-DUR® N-3400 (137 g) and a 0.01% solution of dibutyltin dilaurate dissolved in methyl ethyl ketone (5.50 g). The reaction mixture was maintained at 76.6° C. for ca. 7 h and then cooled to room temperature. A 1% solution of benzyl chloride dissolved in methyl ethyl ketone (5.5 g) was then added to the reaction mixture. The resulting thiodiglycol polyformal-isocyanate prepolymer had an isocyanate content of 3.31% and a viscosity of 697 poise.

Example 5

HDI-Uretidione-Terminated Polyformal-Isocyanate Prepolymer

The thiodiglycol polyformal polyol of Example 1 (504 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of DESMO-DUR® N-3400 (521 g) and a 0.01% solution of dibutyltin dilaurate dissolved in methyl ethyl ketone (10.3 g). The reaction mixture was maintained at 76.6° C. for ca. 7 h and then cooled to room temperature. A 1% solution of benzyl chloride dissolved in methyl ethyl ketone (10.4 g) was then added to the reaction mixture. The resulting thiodiglycol polyformal-isocyanate prepolymer had an isocyanate content of 8.94% and a viscosity of 46 poise.

Example 6

Isophorone-Terminated Polyformal-Isocyanate Prepolymer

The thiodiglycol polyformal polyol of Example 1 (325 g) was charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of DESMO-DUR® I (62.5 g) (IPDI) and a 0.01% solution of dibutyltin dilaurate dissolved in methyl ethyl ketone (4 g). The reaction mixture was maintained at 76.6° C. for ca. 7 h and then cooled to room temperature. A 1% solution of benzyl chloride dissolved in methyl ethyl ketone (4 g) was then added to the reaction mixture. The resulting thiodiglycol polyformal-isocyanate prepolymer had an isocyanate content of 3.51% and a viscosity of 229 poise.

Example 7

$H_{12}$MDI-Terminated Polythioether-Isocyanate Prepolymer

A thiol-terminated polythioether was prepared according to Example 1 of U.S. Pat. No. 6,172,179. In a 2-L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the reaction mixture was added 4.6 g (0.024 mol) of an azobisnitrile free radical catalyst (VAZO® 67, 2,2'-azobis(2-methylbutyronitrile)). The reaction proceeded substantially to completion after 2 to afford 1,250 g (0.39 mol, yield 100%) of a liquid thiol-terminated polythioether resin having a $T_g$ of −68° C. and a viscosity of 65 poise. The resin was faintly yellow and had low odor.

A 1-liter, 4-neck round-bottomed flask was fitted with a mantle, thermocouple, temperature controller, nitrogen line, mechanical stirrer and dropping funnel. The flask was charged with a thiol-terminated polythioether (652.30 g) prepared according to Example 1 of U.S. Pat. No. 6,172,179 (see previous paragraph). The flask was heated to 71° C. under nitrogen and stirred at 300 rpm. A mixture of 4-hydroxybutyl vinyl ether (47.40 g) and Vazo-67 (1.19 g) was added to the flask in 1 hour via a dropping funnel. The reaction mixture was maintained at 71° C. for ca. 41 hours, at which time the reaction was complete. After this, the reaction apparatus was then fitted with a vacuum line and the product heated to 94° C. Heating was continued for 1.3 hours under vacuum. Following vacuum treatment, a pale yellow, viscous polythioether polyol (678.80 g) was obtained. The polythioether polyol had a hydroxyl number of 31.8 and a viscosity of 77 Poise.

The polythioether polyol (300.03 g) was then charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polythioether polyol was stirred at ca. 200 rpm and heated to 76.6° C. (170° F.), followed by the addition of DESMODUR® W ($H_{12}$MDI) (82.90 g) and a 0.01% solution of dibutyltin dilaurate dissolved in methyl ethyl ketone (3.90 g). The reaction mixture was maintained at 76.6° C. for ca. 7 h and then cooled to room temperature. A 1% solution of benzyl chloride dissolved in methyl ethyl ketone (3.80 g) was then added to the reaction mixture. The resulting $H_{12}$MDI-terminated polythioether prepolymer had an isocyanate content of 4.47% and a viscosity of 282 poise.

Comparative Example 8

$H_{12}$MDI-Terminated Terminated Poly(tetrahydrofuran) Prepolymer

TERATHANE® T-2000 (poly(tetrahydrofuran)) (400 g) was charged into in a 1,000-mL, 3-neck, round-bottom flask. The flask was equipped with a mantle, thermocouple, temperature controller, an inlet for providing nitrogen positive pressure, and a mechanical stirrer (PTFE paddle and bearing). TERATHANE® T-2000 was heated to 76.6° C. (170° F.) and stirred. DESMODUR® W ($H_{12}$MDI) (137.2 g) and a 0.01% solution of dibutyltin dilaurate dissolved in methyl ethyl ketone (3.3 g) were added to the flask. The mixture was reacted at 76.6° C. (170° F.) for ca. 6 h, at which time a 1% solution of benzyl chloride dissolved in methyl ethyl ketone (3.3 g) was added. The resulting poly(tetrahydrofuran)-isocyanate prepolymer had an isocyanate content of 4.67% and a viscosity of 479 poise.

Comparative Example 9

$H_{12}$MDI-Terminated Polybutadiene Prepolymer

KRASOL® LBH-P 2000 (hydroxyl-terminated polybutadiene) (200 g) and KRASOL® HLBH-P 2000 (hydrogenated hydroxyl terminated polyolefin) (200 g) were charged into in a 1,000-mL, 3-neck, round-bottom flask. The flask was equipped with a mantle, thermocouple, temperature controller, an inlet for providing nitrogen positive pressure, and a mechanical stirrer (PTFE paddle and bearing). The mixture was heated to 76.6° C. (170° F.) and stirred. DESMODUR® W ($H_{12}$MDI) (137.4 g) and a 0.01% solution of dibutyltin dilaurate dissolved in methyl ethyl ketone (5.4 g) were added to the flask. The mixture was reacted at 76.6° C. (170° F.) for ca. 6 h, at which time a 1% solution of benzyl chloride dissolved in methyl ethyl ketone (5.4 g) was added to the reaction mixture. The resulting polybutadiene-isocyanate prepolymer had an isocyanate content of 5.34% and a viscosity of 892 poise.

Example 10

Cured Composition of H MDI-Terminated Polyformal Prepolymer

A 12×12 in$^2$ polyethylene sheet was placed on a flat 12×12×0.25 in$^3$ stainless steel plate. Four, 12×1×0.125 in$^3$ spacers were placed on the edges of the polyethylene sheet. The polyformal-isocyanate prepolymer of Example 2 (90 g), pelargonic acid (1.1 g), and ETHACURE® 300 (8.15 g, Albemarle Corporation) were added to a plastic container. The materials were mixed first by hand, and then for 60 seconds at 2,300 rpm in a mixer (DAC 600 FVZ).

The mixed composition was poured uniformly onto the polyethylene sheet between the spacers. A second 12×12 in$^2$ polyethylene sheet was placed on the top of the composition such that the second polyethylene sheet was separated from the first polyethylene sheet by the 0.125-in spacers. A second 12×12×0.125 in$^3$ thick stainless steel plate was placed on top of the second polyethylene sheet. The composition, sandwiched between the two polyethylene sheets, was cured at room temperature for 48 h, followed by 24 h at 140° F. Finally, the polyethylene sheets were removed to provide a flat, ca. 0.125-in thick, cured polymer sheet.

The hardness, tensile strength and elongation, tear strength, volume swell and water resistance of the polymer sheet are shown in Table 1. The hardness of cured polymer was measured according to ASTM D2240; tensile strength and elongation were measured according to ASTM D412; and tear strength was measured according to ASTM D624 Die C. Weight loss was measured according to SAE AS5127/1B §7.4, and volume swell was measured according to SAE AS 5127/1B §7.5.

Example 11

Cured Composition of HDI-Uretidione-Terminated Polyformal Prepolymer

A cured polymer sheet was prepared as described in Example 10 for a composition containing the polyformal-isocyanate prepolymer (HDI-uretidione terminated) of Example 3 (50 g), pelargonic acid (0.55 g), and ETHACURE® 300 (4.13 g). The properties of the cured sealant are presented in Table 1.

Example 12

Cured Composition of HDI-Uretidione-Terminated Polyformal Prepolymer

A cured polymer sheet was prepared as described in Example 10 for a composition containing the polyformal-isocyanate prepolymer of Example 4 (HDI-uretidione-terminated) (50 g), pelargonic acid (0.55 g), and ETHACURE® 300 (4.02 g). The properties of the cured sealant are presented in Table 1.

Example 13

Cured Composition of HDI/IPDI-Uretidione-Terminated Polyformal Prepolymer

A cured polymer sheet was prepared as described in Example 10 for a composition containing the HDI-uretidione-terminated polyformal-isocyanate prepolymer of Example 5 (12 g), the IPDI-terminated polyformal isocyanate prepolymer of Example 6 (48 g), pelargonic acid (0.72 g), and ETHACURE® 300 (6.69 g). The properties of the cured sealant are presented in Table 1.

Comparative Example 14

Cured Composition of $H_{12}$MDI-Terminated Poly(tetrahydrofuran)

A cured polymer sheet was prepared as described in Example 10 for a composition containing the $H_{12}$MDI-terminated poly(tetrahydrofuran) prepolymer of Comparative Example 8 (50 g), pelargonic acid (0.6 g), and ETHACURE® 300 (5.67 g). The properties of the cured sealant are presented in Table 1.

Comparative Example 15

Cured Composition of Hydroxyl-Terminated Polybutadiene/Hydrogenated Hydroxyl-Terminated Polyolefin Prepolymer A cured polymer sheet was prepared as described in Example 10 for a composition containing the $H_{12}$MDI-terminated hydroxyl-terminated polybutadiene/hydrogenated hydroxyl-terminated polyolefin prepolymer of Comparative Example 9 (50 g), pelargonic acid (0.6 g), and ETHACURE® 300 (6.48 g). The properties of the cured sealant are presented in Table 1.

Example 16

Cured Compositions of $H_{12}$MDI-Terminated Polythioether Prepolymer and $H_{12}$MDI-Terminated Polyformal Prepolymer Cured polymer sheets were prepared as described in Example 10 for compositions containing the polyformal-isocyanate prepolymer ($H_{12}$MDI-terminated) of Example 2 (32 g), the $H_{12}$MDI-terminated polythioether prepolymer of Example 7 (18 g), pelargonic acid (0.6 g), and ETHACURE® 300 (4.85 g). The properties of the cured sealant are presented in Table 1.

Example 17

Cured Compositions Prepared Using Polyformal-Isocyanate Prepolymers, Polythioether-Isocyanate Prepolymers, and Amine Curing Agents Cured compositions A-K were prepared according to Example 10. Compositions A-K contained the components as presented in Table 2 and the properties of the cured compositions are presented in Tables 3-6. In Table 2, the isocyanate content refers to the percent isocyanate of the prepolymer and the isocyanate prepolymer weight refers to the weight in grams of the isocyanate prepolymer reacted to provide the composition. N3400 refers to DESMODUR® N3400 and the $H_{12}$MDI was DESMODUR® W. To form the polyformal-isocyanate prepolymers, a thiodiglycol polyformal prepared according to Example 1 was reacted with DESMODUR® N3400 or DESMODUR® W as described in Example 2. To form the polythioether-isocyanate prepolymers, a polythioether polyol prepared as in Example 7, was reacted with DESMODUR® W as described in Example 7.

TABLE 1

| Composition/Property | Example 10 | Example 11 | Example 12 | Example 13 | Comparative Example 14 | Comparative Example 15 | Example 16 |
|---|---|---|---|---|---|---|---|
| Dry Tensile Strength, psi | 1170 | 640 | 616 | 1382 | 5062 | 2166 | 1011 |
| Dry Elongation, % | 466 | 146 | 79 | 363 | 601 | 293 | 576 |
| Dry Tear Strength, pli | 178 | 84 | 75 | 144 | 438 | 206 | 172 |
| Dry Hardness, Shore A | 82 | 75 | 70 | 80 | 80 | 81 | 64 |
| JRF Tensile Strength*, psi | 918 | 493 | 447 | 872 | 1674 | 263 | 731 |
| JRF Elongation*, % | 393 | 119 | 64 | 374 | 588 | 135 | 567 |
| JRF Tear Strength*, pli | 158 | 32 | 25 | 76 | 11 | 16 | 117 |
| JRF Hardness*, Shore A | 79 | 67 | 70 | 67 | 55 | 76 | 64 |
| JRF Volume Swell,* % | 24 | 14 | 14 | 17 | 116 | 185 | 16 |
| Water Resistance** | Excellent | Excellent | Excellent | Excellent | Excellent | Excellent | Excellent |

*Tested following immersion of sample in Jet Reference Fuel Type I for 7 days at 140° F.
**Tested following immersion of sample in water for 7 days at 200° F.

TABLE 2

| | A | B | C | D | E | F | G | H | I | J | K |
|---|---|---|---|---|---|---|---|---|---|---|---|
| Polyformal-isocyanate Prepolymer 1 | | | | | | | | | | | |
| Isocyanate | N-3400 | $H_{12}$MDI | $H_{12}$MDI | | | | $H_{12}$MDI | | $H_{12}$MDI | | |
| Isocyanate Content (%) | 8.91 | 4.74 | 4.74 | | | | 4.74 | | 4.74 | | |
| Isocyanate Prepolymer Weight (g) | 10.5 | 57.6 | 44.1 | | | | 33 | | 6.65 | | |
| Polyformal-isocyanate Prepolymer 2 | | | | | | | | | | | |
| Isocyanate | | $H_{12}$MDI | $H_{12}$MDI | | | | | | $H_{12}$MDI | $H_{12}$MDI | |
| Isocyanate Content (%) | | 2.67 | 3.73 | | | | | | 3.73 | 3.73 | |
| Isocyanate Prepolymer Weight (g) | | 32.4 | 44.1 | | | | | | 32 | 18.35 | |
| Polythioether-isocyanate Prepolymer 1 | | | | | | | | | | | |
| Isocyanate | $H_{12}$MDI | | | $H_{12}$MDI | $H_{12}$MDI | | $H_{12}$MDI | $H_{12}$MDI | $H_{12}$MDI | $H_{12}$MDI | |
| Isocyanate Content (%) | 2.67 | | | 4.47 | 4.47 | | 4.47 | 4.47 | 4.47 | 4.47 | |
| Isocyanate Prepolymer Weight (g) | 39.5 | | | 60 | 27 | | 18 | 11.25 | 27 | 60 | |
| Polythioether-isocyanate Prepolymer 2 | | | | | | | | | | | |
| Isocyanate | | | | | $H_{12}$MDI | $H_{12}$MDI | $H_{12}$MDI | | $H_{12}$MDI | $H_{12}$MDI | |
| Isocyanate Content (%) | | | | | 3.63 | 3.63 | 3.63 | | 3.63 | 3.63 | |
| Isocyanate Prepolymer Weight (g) | | | | | 33 | 60 | 17 | | 13.75 | 33 | |
| ETHACURE ® 300 (g) | 4.83 | 8.72 | 0.97 | 6.51 | 5.83 | 5.27 | 4.85 | 4.85 | 4.85 | 5.83 | 6.51 |
| Pelargonic Acid (g) | 0.6 | 1.08 | 0.72 | 0.72 | 0.72 | 0.66 | 0.6 | 0.6 | 0.6 | 0.72 | 0.72 |
| Carbon Black (g) | 0 | 0 | 0 | 0 | 0 | 0 | 0 | 0 | 0 | 7.2 | 7.2 |
| DUALITE ™ (g) | 0 | 0 | 0 | 0 | 0 | 0 | 0 | 0 | 0 | 6.8 | 6.8 |

TABLE 3

| Test | Property | A | B | C |
|---|---|---|---|---|
| Dry | T/E† (psi/%) | 963/272 | 1227/551 | 1233/612 |
|  | Hardness (A) | 78 | 82 | 75 |
|  | Tear (pli) | 165 | 308 | 177 |
| Water** | T/E (psi/%) | 183/109 | 330/186 | 321/146 |
|  | Hardness (A) | 42 | 64 | 54 |
|  | Tear (pli) | 32 | 76 | 53 |
|  | VS %/WL %§ | 4.2/3.5 | 2.7/2.3 | 3.6/2.5 |
| JRF* | T/E (psi/%) | 731/233 | 1072/593 | 1264/656 |
|  | Hardness (A) | 50 | — | 69 |
|  | Tear (pli) | 145 | 247 | 127 |
|  | VS %/WL %§ | 16.9/1.9 | 16.3/1.3 | 15.8/3.0 |

*Tested following immersion of sample in Jet Reference Fuel Type I for 7 days at 140° F.
**Tested following immersion of sample in water for 7 days at 200° F.
†Tensile strength (psi)/Elongation (%)
§Volume Swell (%)/Weight Loss (%)

TABLE 4

| Composition/Properties | D | E | F |
|---|---|---|---|
| Pot Life (hr) | >2 | >2 | >2 |
| Dry T/E (psi/%); Hardness (Shore A) | 2060/792, 73A | 2023/866, 70A | 1645/771, 70A |
| JRF* T/E (psi/%); Hardness (Shore A) | 1318/726, 66A | 1343/795, 62A | 924/649, 62A |
| Water** T/E (psi/%); Hardness (Shore A) | 202/213, 50A | 150/245, 40A | 116/266, 30A |
| Dry Tear (pli) | 270 | 263 | 217 |
| JRF* Tear (pli) | 136 | 132 | 119 |
| Water** Tear (pli) | 59 | 44 | 37 |
| JRF* VS %/WL % | 20.7/2.6 | 21.0/2.7 | 22.4/1.9 |
| Water** VS %/WL % | 4.9/3.6 | 5.9/3.3 | 5.0/3.4 |

*Tested following immersion of sample in Jet Reference Fuel Type I for 7 days at 140° F.
**Tested following immersion of sample in water for 7 days at 200° F.

TABLE 5

| Composition/Properties | G | H | I |
|---|---|---|---|
| Dry T/E (psi/%); Hardness (Shore A) | 1825/770, 75A | 1011/576, 70A | 1440/743, 76A |
| JRF* T/E (psi/%); Hardness (Shore A) | 1143/533, 64A | 731/567, 64A | 916/584, 68A |
| Water** T/E (psi/%); Hardness (Shore A) | 263/322, 49A | 203/147, 49A | 236/216 50A |
| Dry Tear (pli) | 259 | 172 | 155 |
| JRF* Tear (pli) | 139 | 117 | 139 |
| Water** Tear (pli) | 68 | 40 | 54 |
| JRF* VS %/WL % | 18.8/2.7 | 16.1/3.3 | 16.5/3.11 |
| Water** VS %/WL % | 4.7/3.2 | 3.5/3.3 | 3.9/3.2 |

*Tested following immersion of sample in Jet Reference Fuel Type I for 7 days at 140° F.
**Tested following immersion of sample in water for 7 days at 200° F.

TABLE 6

| Composition/Properties | J | K |
|---|---|---|
| Specific Gravity | 0.8 | 0.8 |
| Dry T/E (psi/%); Hardness (Shore A) | 873/461, 70A | 765/321, 76A |
| JRF* T/E(psi/%); Hardness (Shore A) | 748/536, 60A | 673/460, 64A |
| Water** T/E(psi/%); Hardness (Shore A) | 139/107, 50A | 170/75, 54A |
| Dry Tear (pli) | 147 | 143 |
| JRF* Tear (pli) | 100 | 99 |
| Water** Tear (pli) | 40 | 44 |
| JRF* VS %/WL % | 11.6/1.6 | 13.0/1.5 |
| Water** VS %/WL % | −9.3/3.0 | −9.6/2.8 |
| Water 27 days | 43A | 63A |

*Tested following immersion of sample in Jet Reference Fuel Type I for 7 days at 140° F.
**Tested following immersion of sample in water for 7 days at 200° F.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising a polyformal-isocyanate prepolymer, wherein the polyformal-isocyanate prepolymer comprises the reaction products of reactants comprising a polyformal polyol and 4,4'-methylene dicyclohexyl diisocyanate; wherein the polyformal polyol comprises a polyformal polyol having the structure of Formula (18):

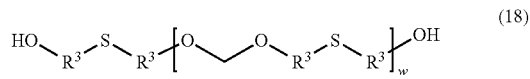

(18)

wherein w is selected from an integer from 2 to 50; and each $R^3$ is ethane-1,2-diyl.

2. The composition of claim 1, wherein the molar ratio of the 4,4'-methylene dicyclohexyl diisocyanate to the polyformal polyol is greater than 2 to 1.

3. The composition of claim 1, wherein the polyformal polyol comprises the reaction product of reactants comprising thiodiglycol and paraformaldehyde.

4. The composition of claim 1, comprising dimethylthiotoluenediamine.

5. The composition of claim 1, formulated as a sealant.

6. A method of sealing a surface, comprising:
mixing the composition of claim 5 with dimethylthiotoluenediamine to provide a curable composition;
applying the curable composition to a surface; and
curing the sealant to seal the surface.

7. A composition comprising:
a polyformal-isocyanate prepolymer comprising the reaction products of reactants comprising a polyformal polyol and a first diisocyanate; and
a polythioether-isocyanate prepolymer comprising the reaction products of a polythioether polyol and a second diisocyanate;

wherein the polyformal polyol comprises a polyformal polyol having the structure of Formula (18):

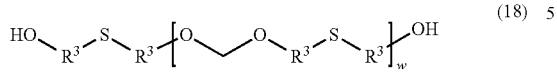 (18)

wherein w is selected from an integer from 2 to 50; and each $R^3$ is ethane-1,2-diyl;

wherein the polythioether polyol comprises the reaction product of reactants comprising a hydroxy vinyl ether and a thiol-terminated polythioether selected from a thiol-terminated polythioether adduct of Formula (15a), a thiol-terminated polythioether adduct of Formula (15b), and a combination thereof:

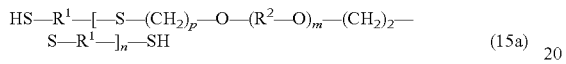 (15a)

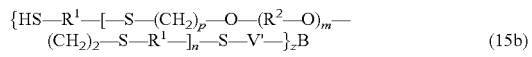 (15b)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—$CHR^3$—)$_s$—X—]$_q$—(—$CHR^3$—)$_r$—, wherein,
s is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—$CHR^3$—)$_s$—X—]$_q$—(—$CHR^3$—)$_r$—, wherein s, q, r, $R^3$, and X are as defined as for $R^1$;
m is an integer from 0 to 50;
n is an integer from 1 to 60;
p is an integer from 2 to 6; and
wherein the first diisocyanate and the second diisocyanate are selected from 4,4'-methylene dicyclohexyl diisocyanate.

8. The composition of claim 7, wherein,
the molar ratio of the first diisocyanate to the polyformal polyol is greater than 2 to 1; and
the molar ratio of the second diisocyanate to the polyformal polyol is greater than 2 to 1.

9. The composition of claim 7, wherein the hydroxy vinyl ether comprises hydroxybutyl vinyl ether.

10. The composition of claim 7, wherein the polyformal polyol comprises the reaction product of reactants comprising thiodiglycol and paraformaldehyde.

11. The composition of claim 7, wherein the thiol-terminated polythioether comprises the reaction product of one or more compounds of Formula (16); one or more compounds of Formula (17); and one or more polyfunctionalizing agents:

HS—$R^1$—SH (16)

$CH_2$=CH—O—[—$R^2$—O]$_m$CH=$CH_2$ (17)

wherein:
each $R^1$ is independently selected from $C_{2-6}$ alkanediyl, $C_{6-8}$ cycloalkanediyl, $C_{6-10}$ alkanecycloalkanediyl, —[(—$CH_2$—)$_p$—X—]$_q$—(—$CH_2$—)$_r$—, and —[(—$CH_2$—)$_p$—X—]$_q$—(—$CH_2$—)$_r$—, wherein at least one —$CH_2$— group is substituted with a methyl group;
each $R^2$ is independently selected from $C_{2-6}$ alkanediyl, $C_{6-8}$ cycloalkanediyl, $C_{6-10}$ alkanecycloalkanediyl, —[(—$CH_2$—)$_p$—X—]$_q$—(—$CH_2$—)$_r$—, —[(—$CH_2$—)$_p$—X—]$_q$—(—$CH_2$—)$_r$—;
each X is selected from —O—, —S— and —$NR^{10}$—, wherein $R^{10}$ is selected from hydrogen and methyl;
each m is independently selected from an integer from 0 to 10;
each p is independently selected from an integer from 2 to 6;
each q is independently selected from an integer from 0 to 5; and
each r is independently selected from an integer from 2 to 10.

12. The composition of claim 7, wherein the thiol-terminated polythioether comprises a combination of polythioether dithiols and polythioether trithiols.

13. The composition of claim 7, comprising an aromatic amine curing agent.

14. The composition of claim 13, wherein the aromatic amine comprises dimethylthiotoluenediamine.

15. The composition of claim 7, formulated as a sealant.

16. A method of sealing a surface, comprising:
mixing the composition of claim 15 with a curing agent to provide a curable composition;
applying the curable composition to a surface; and
curing the sealant to seal the surface.

17. A composition comprising:
a polyformal-isocyanate prepolymer comprising the reaction products of reactants comprising thiodiglycol, paraformaldehyde, a polythioether polyol, and 4,4'-methylene dicyclohexyl diisocyanate; and
a polythioether-isocyanate comprising the reaction products of a combination of polythioether dithiols and polythioether trithiols, hydroxybutyl vinyl ether, and 4,4'-methylene dicyclohexyl diisocyanate.

18. The composition of claim 17, comprising an aromatic amine curing agent.

19. The composition of claim 18, wherein the curing agent comprises dimethylthiotoluenediamine.

20. The composition of claim 17, formulated as a sealant.

21. A method of sealing a surface, comprising:
mixing the composition of claim 20 with a curing agent to provide a curable composition;
applying the curable composition to a surface; and
curing the sealant to seal the surface.

* * * * *